Dec. 29, 1970   O. M. HEITMAN   3,550,306

FISH BAIT HOLDER AND METHOD

Filed Dec. 16, 1968

INVENTOR
OLIVER M. HEITMAN,

BY *Philip P. Siggers*
ATTORNEY

United States Patent Office 3,550,306
Patented Dec. 29, 1970

3,550,306
FISH BAIT HOLDER AND METHOD
Oliver M. Heitman, 201 N. Winter St.,
River Falls, Wis. 54022
Filed Dec. 16, 1968, Ser. No. 784,025
Int. Cl. A01k *85/00, 83/06*
U.S. Cl. 43—42.37                    8 Claims

ABSTRACT OF THE DISCLOSURE

A fish bait holder has a body serving as a jig head and being substantially heavier than water. The jig head is attachable to the end of a fishing line so that it may be drawn through a body of water. A hook is rigidly fixed to and extends from one end of the jig head. An elastic band is affixed at one end to the jig head and extends a substantial distance beyond the confines of the jig head. A second hook is attached to the elastic band outside the jig head and cooperates with the first-mentioned hook to hold bait of various descriptions. The second hook may be slid along the elastic band to the desired location, thereby making possible a more secure attachment of the bait.

---

This invention relates to fish lures or bait holders that are attachable to fishing lines and may be drawn through bodies of water with the object of catching fish.

A general object of the invention is to provide a bait holder which will securely attach a wide variety of baits to a fishing line. Among the live baits that may be held are frogs, tadpoles, night crawlers, minnows, chubs, crabs, eels, small snakes and suckers. Artificial baits resembling live baits (which are often fairly expensive) may also be held upon the line without danger of loss. The bait holder of the invention may be used in trolling, still fishing or casting.

A more specific object of the invention is to enhance the security of the attachment so that the bait will not be lost even though the fishing line is jerked or the bait is dragged over rocks, sunken logs or other underwater obstructions.

A further object is to provide an improved method of making a fish bait holder which includes embedding in a leaden mass, forming the body of the bait holder, a portion of an elastic band which is also secured to the shank of a hook that is likewise embedded in the bait holder but has its barb and its eye outside the bait holder.

A more specific object is to make a fish bait holder having exceptionally dependable bait-holding means by forming a lead body to which a hook is affixed by having its shank, which is bent at right angles, embedded in the lead body, but with the barb and the eye of the hook both outside the lead body; an elastic band being secured to said shank near said right angle bend and extending outside the lead body; a second hook being slidable along the elastic band to the desired point to provide a secure bait-holding means.

Further objects and advantages of the invention will become apparent by referring to the following description of a preferred embodiment of the invention, and to the accompanying drawings forming a part of this specification.

To understand the present invention, it is believed best to describe first the method of making the bait holder.

Figure 2:
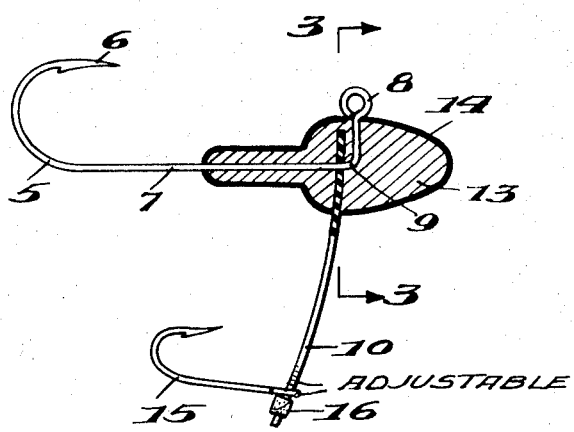
FIG. 2 is an enlarged longitudinal section through the body of the bait holder.
Figure 3:
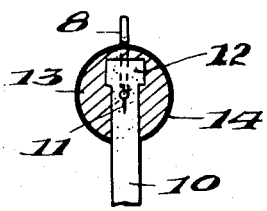
FIG. 3 is a cross section on line 3—3 of FIG. 2.

I take a metallic fish hook 5 having a barb 6, a shank 7 and an eye 8 and bend it at right angles as indicated at 9. Then I attach a rubber, "Neoprene" or other elastic band 10 to the shank of the hook by slitting the elastic band as indicated at 11. The band has an enlarged end 12 and it is moved along the hook until that end is adjacent the right angle bend 9, as shown in FIG. 2. Then the hook and band assembly is placed in a special steel mold (not shown) with the barb, part of the shank and the eye outside the mold, also with the major part of the elastic band outside. Molten lead (or other non-rusting metal of a low melting point) is poured into the mold. It is of course essential that the pouring temperature be lower than the temperature at which the elastic band will disintegrate or soften and lose its shape. The mold is allowed to cool, either by natural radiation to the atmosphere or by artificial cooling; then the casting 13 is removed. A coat of paint such as a lacquer paint 14 is then applied to the lead body and dried by heat. A second hook 15, preferably but not necessarily smaller than hook 5, has its eye slipped onto the outer end of the elastic band, which must be stretched to reduce its width while being run through the eye. Either a knot 16 or some other enlargement is formed on the outer end of the elastic band to prevent the hook 15 from falling off or being pulled off.

Figure 1:
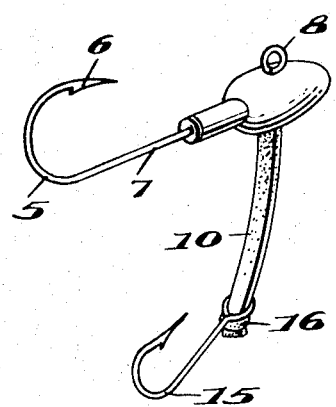
FIG. 1 is a perspective view of the preferred form of bait holder of my invention.
Figure 4:
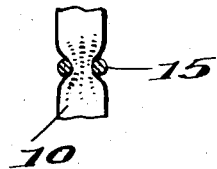
FIG. 4 is a detail showing in section how the eye of a hook surrounds and pinches the elastic band that carries it.

The bait holder is now complete. The elastic band is movable in all directions, can be stretched, and therefore can be wrapped tightly around a bait attached to hook 5 and have its barb thrust into the bait to make a very secure attachment. As FIG. 4 shows, the eye of hook 15 has an inside diameter substantially smaller than the width of the elastic band. Hence the elastic band is pinched and due to its tendency to expand, it offers considerable frictional resistance to movement of the hook; yet the hook can be moved to any point along its length to adjust the hook's position relative to the jig head.

Many variations in the described bait holder may be employed. For example, the elastic band could be attached so as to emerge from the right side or the left side or from the nose or the tail or the top of the lead body. The principal hook 5 could have two barbs and points. Instead of a lacquer paint coating, a layer of a plastic composition might be applied. The body 13 of the casting may have various shapes and need not have a tail structure as illustrated. Feathers, hairs, yarns, plastic filaments and other coverings enhancing the attractiveness of the jig head may be applied. Other modifications will be evident to those skilled in the art.

What I claim is:

1. A fish bait holder comprising, in combination, a body substantially heavier than water, hereinafter termed the jig head; a hook including a barb, a shank, and an eye at one end of the shank; part of said shank being embedded in the jig head and having a right angle bend within the jig head and extending to the surface of the jig head; said eye being outside said jig head, permitting attachment of a fishing line to said jig head; an elastic band affixed at one end within said jig head, the principal length of said elastic band being outside of said jig head; and a second hook held on the elastic band outside of said jig head and slidable on the elastic band to adjust its position.

2. The invention defined in claim 1, wherein the jig head is a substantially solid lead body coated on the outside with a baked lacquer paint.

3. The invention defined in claim 1, wherein the elastic band is made of "Neoprene" and is penetrated by the shank of the first-named hook adjacent said right angle bend, the elastic band having an enlarged end within the body of the jig head.

4. The invention defined in claim 1, wherein the eye of the first-mentioned hook is located approximately half way between the ends of the jig head, and the second-mentioned hook has an eye by which it is attached to said elastic band, the second-mentioned hook being considerably smaller than the first-mentioned hook.

5. A fish bait holder comprising, in combination a jig head substantially heavier than water and constructed so as to be attachable to a fishing line; a hook rigidly fixed to and extending from the rear end of the jig head; an elastic band affixed at one end to the jig head at a point intermediate the forward and rear ends of the jig head and extending a substantial distance outside the jig head; and a second hook attached by its eye to the elastic band outside the jig head, the two hooks cooperating with the jig head to hold bait on the end of a fishing line.

6. The invention defined in claim 5, wherein the jig head is made of lead; the first-mentioned hook has part of its shank embedded in the lead body; and the elastic band has one end secured inside the lead body, the other end thereof being free; the second-mentioned hook being adjustable for the entire length of the elastic band outside the jig head.

7. The invention defined in claim 5, wherein the second hook is held on the elastic band by passing said band through the eye of the hook; the elastic band being substantially wider than the inside diameter of said hook eye, so that the elastic band offers a substantial frictional resistance to movement of the hook thereon; the outer end of the elastic band having means to prevent the hook from falling off or being pulled off.

8. A method of making a fish bait holder which consists in making a hook with a point, barb, shank and eye, the shank having a right angle bend; preparing an elastic band with an enlarged end; passing the point, barb and part of the shank of said hook through the elastic band near said enlarged end; placing part of the hook including said right angle bend inside a mold and pouring lead into the mold at a temperature such as will not melt or weaken the elastic band; the lead casting thus formed having the hook extending from one end and having the eye of the hook outside the casting to permit attaching a fishing line thereto; the major length of the elastic band dangling from said casting; applying a protective coating to said casting; and securing a hook to the elastic band so as to be adjustable along said major length.

References Cited

UNITED STATES PATENTS

| 756,009 | 3/1904 | Flegle | 43—44.81X |
|---|---|---|---|
| 2,974,436 | 3/1961 | Gourlay | 43—44.4 |
| 3,191,336 | 6/1965 | Cordell, Jr. | 43—42.53X |

WARNER H. CAMP, Primary Examiner

U.S. Cl. X.R.

43—42.53, 44.2